United States Patent [19]
Shultz

[11] 4,012,161
[45] Mar. 15, 1977

[54] ROTARY CUTTING DEVICE

[76] Inventor: William E. Shultz, 239 N. Main St., Lombard, Ill. 60148

[22] Filed: Nov. 4, 1975

[21] Appl. No.: 628,484

Related U.S. Application Data

[62] Division of Ser. No. 470,165, May 15, 1974, abandoned.

[52] U.S. Cl. .................................. 408/1 R; 29/427; 90/11 C; 408/112
[51] Int. Cl.² .......................................... B23B 35/00
[58] Field of Search .......... 90/11 C, 12 R; 408/112, 408/1; 29/200 D, 233; 228/19, 125

[56] References Cited
UNITED STATES PATENTS

| | | | |
|---|---|---|---|
| 385,133 | 6/1888 | Perkins | 408/112 |
| 1,603,359 | 10/1926 | Schneckloth | 408/112 |
| 2,296,087 | 9/1942 | Burns, Jr. | 29/200 D X |
| 2,430,812 | 11/1947 | Goldberg | 408/112 |
| 2,527,968 | 10/1950 | Sherman et al. | 408/112 |
| 2,918,833 | 12/1959 | Stewart et al. | 408/112 |
| 3,015,240 | 1/1962 | Hodnett | 408/112 X |

Primary Examiner—Francis S. Husar
Assistant Examiner—W. R. Briggs
Attorney, Agent, or Firm—Richard H. Anderson

[57] ABSTRACT

A rotary cutting device for removing spot welds includes an upper body section telescoping into a lower body section and a cutting bit secured in the upper body section and extending through the lower body section. The cutting bit has a flat cutting end so that a spot weld can be completely removed from one metal piece while causing no damage to the metal piece it is welded to. An expansion spring yieldably holds the cutting bit away from cutting engagement with a work piece when not in use. A stop means is provided for controllably limiting the potential downward movement of the cutting bit during use. Two pointed projections extend from the distal cutting end of the device for engaging the work piece to keep the device in proper alignment with the spot weld during cutting.

4 Claims, 11 Drawing Figures

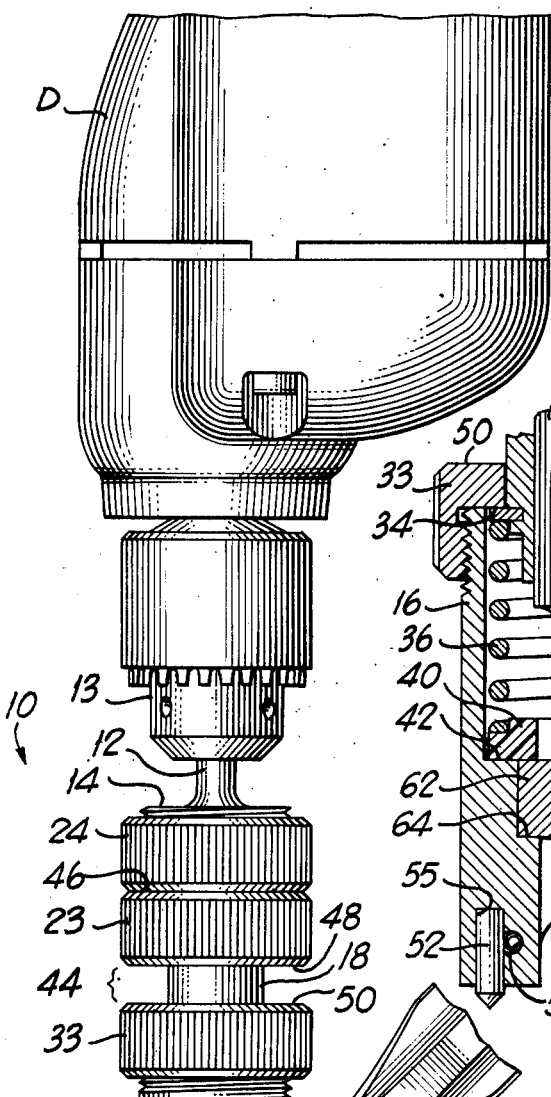
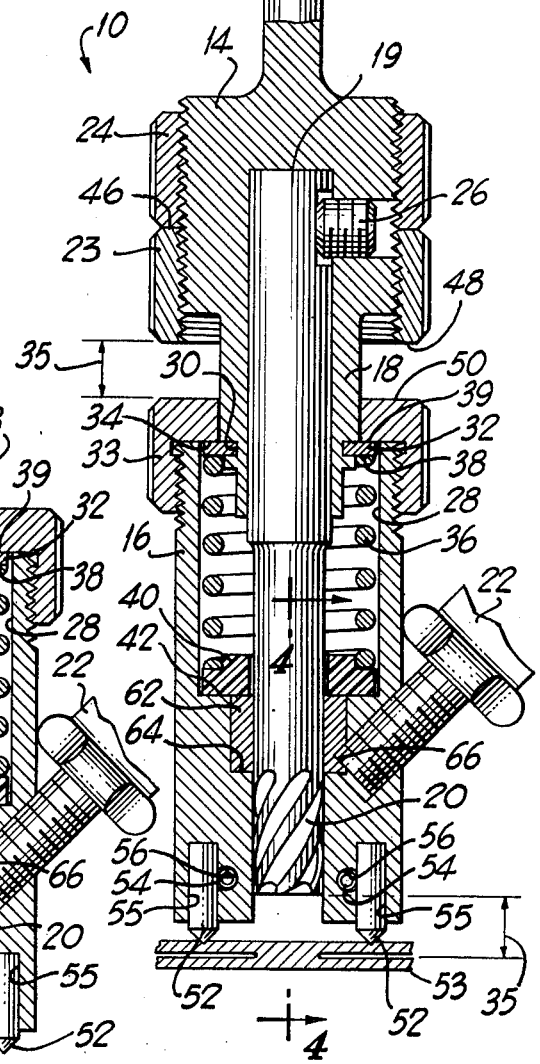
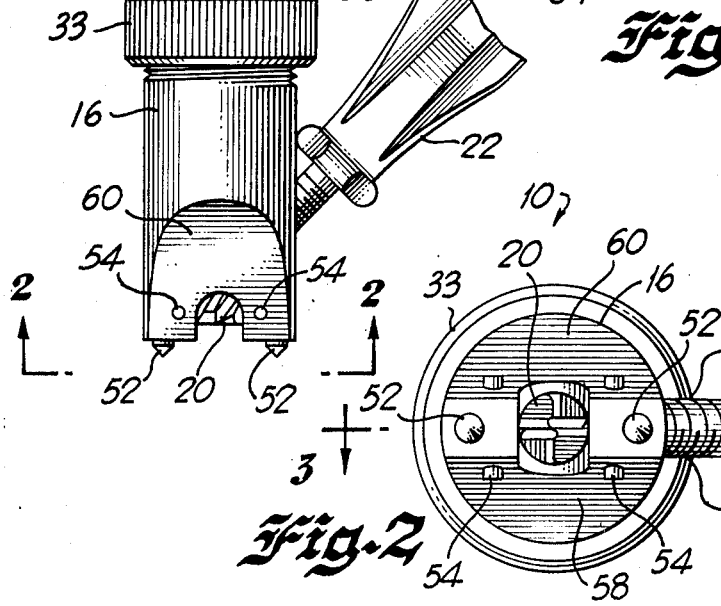
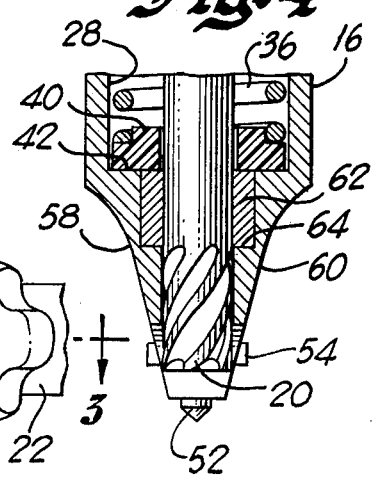

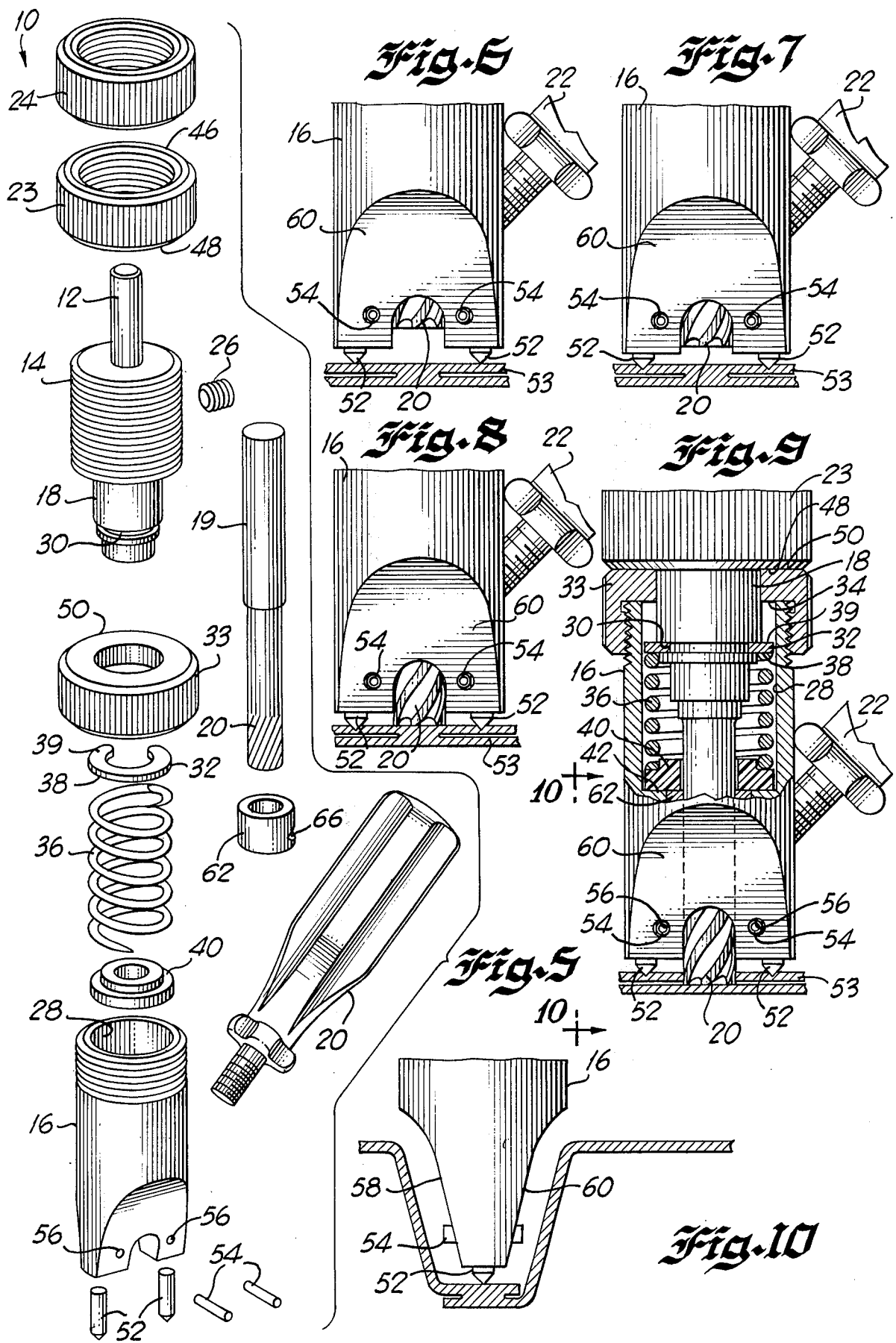

ROTARY CUTTING DEVICE

This is a division of application Ser. No. 470,165 filed May 15, 1974, now abandoned.

This invention relates to a rotary cutting device for separating two pieces of metal joined by a spot weld and more particularly to a tool for controllably cutting and removing spot-welded portions of a first metal piece joined to a second metal piece by one or more spot welds without causing damage to the second piece. The cutting device is particularly well adapted to removing spot welds in the repair and reconstruction of metal sections of an automobile body. Damaged vehicle body parts, commonly expensive and difficult to obtain, can be removed, repaired and re-welded into place.

Spot welding is a common, fast and effective method of securely joining two metal pieces. In the automotive industry, for example, numerous spot welds are used to join sections of a vehicle body. It is often desirable, as in the case of a damaged automobile, to separate two metal pieces joined by spot welds for the purpose of repairing or replacing one or both pieces. In such a case, it is desirable to have a tool that removes the spot welds without causing substantial damage to the metal pieces so that both pieces can be reused. Such a tool is extremely desirable in vehicle body repair shops since many automotive body parts are not readily available and are impossible or very time consuming to locate and obtain. For example, many foreign made automobile body parts are difficult to locate and if replacement were necessary, as opposed to repair, the automobile would have to remain in the body shop for a much longer period of time. A tool is not presently available having the capability of separating the welded pieces without causing substantial damage thereto so that the pieces can be salvaged, repaired and re-welded into position.

A common practice in separating two pieces of spot welded metal is to bend one piece so that a chisel or torch can be inserted between the pieces at the spot weld to destroy the bond. The use of a chisel or torch is premised upon the absolute destruction of the bent metal piece and leaves rough, uneven spot weld protrusions on the second piece. The protrusions must then be tediously ground away. Further, such a procedure often causes the bending or denting of the second metal piece so that the second piece, too, must be replaced or laboriously repaired.

Tools used to remove rivets are not adapted to removing spot welds since (1) such tools need the projection of the rivet head for positioning and supporting the tool at the proper location and (2) rivet removers require a pointed or tapered drill bit to keep the drill in proper alignment with the rivet stem. Without a pointed drill bit, such a rivet remover is unsteady and jumps or slides out of proper alignment during the initial stage of drilling.

Some drilling tools and attachments, some of which are used for rivet removal, are disclosed in the following U.S. Pat. Nos. Bennet-1,023,002; Schneckloth-1,603,359; Wedhorn-1,789,793; Staples-2,093,986; Koonz-2,126,476; Gase-2,129,417; Burns-2,296,087; Zipper-2,363,769; Gray et al.-2,576,786; Hodnett-3,015,240; Shoffner-2,372,398; Kanihan-2,375,112; Bennett-2,822,607; and Godard-3,620,636.

FIELD OF THE INVENTION

In my development of an effective tool for the removal of spot welds, I have found that it is necessary to employ a cutting means having a flat (non-tapered) cutting end. In this manner, the entire spot welds can be removed by cutting through only one of the pieces of metal with substantially no damage to the second piece. Complete removal of a spot weld using a tapered drill bit would necessitate drilling partially into the second work piece leaving a tapered bore which would have to be repaired. The cutting tool of the instant invention causes no damage to the second work piece so that no repair or replacement is necessary.

To employ a non-tapered cutting means in a rotary cutter for removal of a spot weld, I have found that it is necessary to provide means for maintaining the device in alignment with the spot weld. An important feature of the present invention is in the provision of a plurality of pointed projections at the metal-contacting distal end of the cutting device. The projections will take enough purchase into the metal during cutting to prevent the tool from jumping or sliding out of alignment with the spot weld so that dimensionally accurate and complete removal of the spot weld is assured.

Another important feature of this invention resides in the uniquely tapered design of the distal end of the cutting instrument. The tapered design is extremely useful in the initial alignment of the cutting means to overlie the spot weld. By providing a tapered metal-contacting end of the device of the present invention, the operator of the tool can readily observe the position of the cutting means as it is forced into contact with the metal piece. A cutting bit can be readily aligned to overlie a spot weld by initially forcing the bit into contact with the work piece. This initial alignment can be performed even by the inexperienced operator by initially forcing the bit into contact with the spot weld without rotation of the cutting bit until accurate alignment is assured. When the blade is accurately aligned, the rotation of the blade, and therefore spot weld removal, can proceed.

A further important feature of the tapered design of the cutting end of the tool resides in the fact that the tool can be easily inserted into difficultly accessible locations, such as the groove of an automobile trunk gutter (see FIG. 10). The tool is tapered on only two opposing sides to provide a distal end having enough width to straddle a spot weld and enough taper for quick and accurate tool alignment.

One object of the present invention is to provide a new and improved cutting instrument for removal of spot welds in two or more metal pieces without causing substantial damage to said pieces.

Another object of the present invention is to provide a new and improved spot-weld removing tool employing a cutting bit having a non-tapered metal contacting end.

Another object of the present invention is to provide a spot weld removing device having a new and improved tapered design at the metal contacting end for easy alignment of the cutting bit to overlie the spot weld.

Another object of the present invention is to provide a spot weld removing tool having a new and improved means for maintaining the tool in proper alignment during cutting.

Another object of the present invention is to provide a new and improved device for removing spot welds having an easily adjustable stop means for limiting and controlling the depth to which the cutting means can proceed into the metal.

Another object of the present invention is to provide a new and improved spot weld removing tool of very simple and inexpensive construction.

Another object of the present invention is to provide a new and improved method of removing spot welds.

Numerous other objects and advantages of the present invention will be apparent from the following detailed description of the invention with reference to the accompanying drawings in which:

FIG. 1 is a front perspective view of a device constructed in accordance with the principles of the present invention and attached to a common power drill;

FIG. 2 is an enlarged, elevational view of the device of FIG. 1 taken from line 2—2 of FIG. 1;

FIG. 3 is an enlarged partially elevational and partially cross-sectional view of the device of FIG. 1 taken along line 3—3 of FIG. 2;

FIG. 4 is an enlarged, partially elevational and partially cross-sectional fragmentary detailed side view of a portion of the device of FIG. 1 taken along lines 4—4 of FIG. 3;

FIG. 5 is an enlarged, exploded, perspective view of the device of FIG. 1;

FIGS. 6–9 are enlarged, fragmentary, elevational view of a portion of the device of FIG. 1 illustrating the operational sequence of the device of FIG. 1;

FIG. 10 is an enlarged, fragmentary, elevational view of a portion of the device of FIG. 1 taken from line 10—10 of FIG. 9; and FIG. 11 is an enlarged, partially elevational and partially cross-sectional view of an alternate embodiment of the device of FIG. 1 similar to the view of FIG. 3.

Similar reference characters refer to similar parts throughout the several views of the drawings.

Referring now to the drawings, and particularly to FIG. 1, the new and improved spot weld removing device of the present invention is generally referred to by reference numeral 10.

The device generally includes a shank 12 adapted to fit into a chuck 13 of a suitable power unit D, an upper body portion 14, and a lower body portion 16. The upper body portion 14 has a smaller diameter centrally extending portion 18 which telescopes into lower body portion 16. A cutting bit 20 is secured to the device in the upper body portion 14 and extends downwardly through the central extension 18 and through the lower body portion 16. A conveniently shaped handle 22 can be secured to the lower body portion 16 of the device to apply a downward force on lower body portion 16 for maintaining the device in steady cutting position during use.

The upper body portion 14 of the device, best shown in FIG. 2, centrally receives the shank 19 of flat ended cutting bit 20 and is threaded on its outer diameter to receive a depth adjustment member 23 and a locking member 24. The shank 19 of cutting bit 20 is secured to the upper body portion 14 with an adjustable securing means such as a set screw 26. Rotation of tool shank 12 rotates upper body portion 14 and therefore rotates cutting bit 20.

The central extension 16 of upper body portion 14 extends downwardly from the upper body portion 14 and is an integral part thereof. A centrally located elongated bore extends axially through the upper body portion 14, central extension 18 and lower body portion 16 to provide for axial downward movement of cutting bit 20 into the work piece.

The central extension 18 of upper body portion 14 is of a smaller diameter than lower body portion 16 and telescopes into a bore 28 in lower body portion 16. An annular groove 30 (best seen in FIG. 5) is provided in central extension 18 for receiving an annular or truarc ring 32. The ring 32 extends outwardly from groove 30 radially beyond the diameter of central extension 18 to prevent the upper body portion 14 from being separated from lower body portion 16 once stop means 33 is secured in place. The stop means 33 is threadedly secured to the upper end of lower body portion 16 to enclose bore 28 around central extension 16 of upper body portion 14 and to provide a shoulder 34 on its undersurface against which ring 30 is biased for yieldably securing the upper and lower body portions together. The shoulder 34 of the stop means 33 provides a surface against which ring 32 is spring biased to maintain a predetermined distance 35 between stop means 35 and depth adjustment member 23 when the tool is not in use.

A coiled expansion spring 36 is provided within bore 28 in lower body portion 16 to bias central extension 18 of upper body portion 14 against shoulder 34 for preventing downward axial movement of cutting bit 20 until use. The upper end of spring 36 biases the upper surface 39 of ring 32 against shoulder 34 so long as no downward axial force is applied to shank 12. At its lower end, the coiled expansion spring biases washer 40 against the lower end 42 of bore 28. The washer 40 is made of a suitable wear resistant material such as nylon.

The stop means 33 together with the depth adjustment member 23 and the locking member 24 provide control over the downward axial distance cutting bit 20 can be forced, against the spring bias, into a work piece. Depth adjustment member 23 can be axially positioned with respect to the device to provide the desired gap distance 35 between adjustment member 23 and stop means 33. The adjustment member 23 is then locked into the desired axial location on lower body portion 16 by positioning locking member 24 tightly into engagement against the upper surface 46 of adjustment member 23. Depth adjustment member 23, locking member 24 and stop means 33 are each knurled to provide for quick and easy positioning by hand.

By applying a downward axial force on shank 12, as by applying downward force on a power drill D, the upper body portion 14 is forced downward and, therefore, cutting bit 20 is forced downwardly into the work piece a distance equal to the gap distance 35. Gap distance 35 is set so that only the upper metal piece can be cut. Central extension 18 can be calibrated so that adjustment member 23 can easily be set at the desired axial location to provide the correct gap distance 35. When the undersurface 48 of depth adjustment member 23 is forced downwardly into contact with the upper surface 50 of stop means 33 to complete the removal of the spot weld (see FIG. 9), the cutting bit can be forced downward no farther. The adjustment member 23 can be set to cut any desired distance, and even through both pieces as in its use for cutting through an instrument panel of an automobile. In this manner it can be assured that cutting will not proceed beyond the depth of both welded pieces and therefore wires and other instrumentation located behind the panel will not be damaged.

An important feature of the present invention is in the provision of two or more elongated tapered or conically pointed projections 52 extending from the distal end of the lower body portion 16 to contact the metal on each side of a spot weld to be removed. The pointed projections 52 securely engage the top work piece 53 (FIGS. 8 and 9) and thereby maintain the cutting instrument in proper alignment over the spot weld. FIGS. 8 and 9 show, in exaggeration, the engagement of projections 52 into the top work piece. Actually, the projections do not noticeably damage the top metal work piece. It should be emphasized that without these projections 52, I have found that it is impossible to effectively use a cutting instrument employing a flat ended cutting bit for spot weld removal. The pointed projections have an included angle in the range of about 60°–110° and preferably 90°. An included angle of less than about 60° causes noticeable damage to the work piece while an included angle greater than about 110° will not adequately secure the device in position during use. The projections 52 are preferably of hardened metal.

As shown in FIG. 2, an important feature of the present invention resides in providing a flat end cutting bit having blades or flutes extending across the entire annular cutting area. In this manner, a spot weld can be completely removed without cutting into both welded pieces.

The metal pointed projections 52 are securely held in position to extend axially outwardly the same distance from the cutting end of the cutting instrument by roll lock pins or barrel pins 54. Each pointed projection is inserted into an axial bore 55 in the distal end of the cutting instrument such that the pointed projections 52 axially extend beyond the end of lower body portion 16. Each lock pin 54 is inserted into a bore 56 in lower body portion 16 made tangential to each axial bore 55. Each lock pin is cylindrically shaped and made compressible by its fabrication from resilient material and by the provision of a longitudinal gap extending along its entire longitudinal axis. Each lock pin is forced into tangential bore 56 to frictionally engage the outer surface of each pointed projection 52 and thereby secure each projection 52 into position within axial bore 55.

Another very important feature of applicant's invention is in the unique tapered design of the distal end of the cutting instrument. Since enough width must be provided at the work-contacting end of the cutting instrument to provide support for pointed projections 52 for straddling a spot weld, the instrument cannot be tapered on all sides to a point at its distal end. However, by providing a taper (see FIG. 4) on two opposing sides 58 and 60 of the distal end of the instrument, the cutting bit 20 readily can be viewed by the operator while aligning the bit 20 to overlie a spot weld (FIG. 8). Further, the instrument then readily can be inserted into a narrow work area as best shown in FIG. 10.

As best shown in FIGS. 3 and 11, a plurality of collars 62 can be provided, each having a different diameter central bore, for supporting various size cutting bits in the lower body portion 16. Support for the cutting bit 20 in the lower body portion 16 is necessary so that the bit 20 does not bend out of accurate alignment over the spot weld during use. This support can be provided by the wall of the bore in lower body portion 16, or can be provided by an inserted collar 62 as shown in FIGS. 3 and 11. It is preferred to use a collar 62 since various collars can provide for various bit sizes and since then a smaller bit contacting wall area must be hardened.

The collars can be readily inserted from bore 28 in lower body portion 16 to rest against an annular shoulder 64. The collar can be secured in position with an adjustable securing means (not shown) and in a preferred form, can be secured in position by handle 22 (FIGS. 3 and 11). A notch 66 can be provided in collar 62 to enable handle 22 to secure collar 62 in position.

FIGS. 6–9 illustrate the best procedure for the use of the new improved cutting instrument of the instant invention.

The device is first positioned over the spot weld by looking from one of the tapered sides of the device to align the cutting bit 20 to overlie the welded portion of the top metal piece (FIG. 6). Next, by exerting a downward force on the device, the pointed projections are forced into the top metal piece to secure the device in proper alignment during cutting (FIG. 7). The cutting bit is then rotated (FIG. 8) to begin cutting the top metal piece. When the cutting bit cannot proceed downwardly any farther, the spot weld is removed (FIG. 9) and cutting is ceased. It is important that the pointed projections 52 first take some purchase into the top metal piece before rotation of the cutting bit is started so that the device does not jump and slide out of alignment during the initial stages of cutting. A downward force (FIG. 7) must therefore first be exerted on the device before beginning rotation of cutting bit 20.

Another important feature of applicant's invention, best shown in FIG. 5, lies in the ease by which the instrument can be assembled and disassembled for inexpensive initial assembly of the tool or for replacement of a component part. Removal of stop means 33 permits easy separation of top body portion 14 from lower body portion 16 and then unrestricted removal of ring 32, spring 36, washer 40 and collar 62. The replacement of the ring 32, spring 36, washer 40 and collar 62 can be performed without the use of tools by simply threadably removing knurled stop means 33.

Many modifications and variations of the present invention are possible in light of the above teachings. It should be understood that, within the scope of the following claims, the invention may be practiced otherwise than as specifically described above.

What is claimed and desired to be secured by Letters Patent of the United States is:

1. A method of separating two pieces of metal joined by a spot-weld comprising:
   disposing a cutting bit having a flat cutting end of a cutting instrument in position to overlie said spot-weld;
   maintaining a cutting end of said cutting instrument in position over said spot-weld by engaging a first metal piece in a plurality of locations with a plurality of rigid conically pointed projections extending from said cutting end of the cutting instrument;
   forcing said rigid points to extend into a surface of said first metal piece by applying a downward force on said cutting instrument near the cutting end of said cutting instrument;
   forcing the cutting bit into engagement with the surface of said first piece of metal and into the spot welded portion of said first piece while said rigid points extend into said surface of said first metal piece;

cutting said first piece of metal to remove said spot welded portion of said first piece;
controlling the longitudinal depth of the cutting bit to cut substantially only the first piece of metal;
separating the pieces of metal.

2. A method as defined by claim 1 further including controlling the longitudinal depth the cutting bit proceeds into the first piece of metal.

3. A method as defined by claim 1 wherein said downward force applied to said cutting instrument is transmitted through a first hand of a cutting instrument operator at a point adjacent said cutting bit and further including controlling said metal cutting step with a second hand of said cutting instrument operator.

4. A method as defined by claim 1 including controlling the longitudinal movement of the cutting bit to a predetermined distance by stopping the axial movement of the cutting bit.

* * * * *